United States Patent
Hoel

[19]

[11] Patent Number: 5,958,240
[45] Date of Patent: Sep. 28, 1999

[54] SYSTEM FOR RECYCLING WASTE WATER

[76] Inventor: Timothy L. Hoel, P.O. Box 632, Camino, Calif. 95709

[21] Appl. No.: 08/858,799

[22] Filed: May 19, 1997

[51] Int. Cl.[6] .................... C02F 9/00; C02F 1/24; C02F 1/52; C02F 1/48

[52] U.S. Cl. ............. 210/608; 210/609; 210/610; 210/703; 210/716; 210/705; 210/708; 210/723; 210/724; 210/738; 210/802; 210/805; 210/806; 210/195.1; 210/196; 210/199; 210/205; 210/206; 210/221.2; 210/257.1; 210/259; 210/294; 210/295; 210/167; 210/695; 210/223; 210/522

[58] Field of Search .................... 210/522, 610, 210/609, 703, 704, 705, 708, 716, 718, 738, 723, 724, 802, 805, 806, 195.1, 196, 199, 205, 206, 695, 202, 223, 221.1, 221.2, 257.1, 259, 294, 295, 167, 608

[56] References Cited

U.S. PATENT DOCUMENTS

| | | |
|---|---|---|
| 3,549,527 | 12/1970 | Peck . |
| 3,923,658 | 12/1975 | Lancaster . |
| 4,067,813 | 1/1978 | Pielkenrood . |
| 4,189,381 | 2/1980 | Laferty . |
| 4,344,845 | 8/1982 | Pielkenrood . |
| 4,572,786 | 2/1986 | Endo . |
| 4,859,329 | 8/1989 | Fink . |
| 5,013,435 | 5/1991 | Rider . |
| 5,120,435 | 6/1992 | Fink . |
| 5,380,430 | 1/1995 | Overton et al. . |
| 5,401,413 | 3/1995 | Gatt . |
| 5,496,469 | 3/1996 | Scraggs . |
| 5,549,820 | 8/1996 | Bober . |
| 5,571,336 | 11/1996 | Wurzburger . |
| 5,647,977 | 7/1997 | Arnaud . |

FOREIGN PATENT DOCUMENTS

96/12678  5/1996  WIPO .

*Primary Examiner*—Thomas M. Lithgow
*Attorney, Agent, or Firm*—Robert Samuel Smith

[57] ABSTRACT

An apparatus and method for treating waste water to generate clarified water for reuse in industrial processes which includes the steps of adding agents to the waste stream to generate floccules, aerating the waste stream to cause a portion of the floccules to float, decanting floating floccules and lighter than water immiscible pollutants from the top surface of the waste stream, directing the waste stream through an incline clarifier so as to permit heavier than water floccules to form sludge in a bottom region of the clarifier. Sludge and decanted pollutants are sent to a bioremediation tank where hydrocarbons are decomposed and the remaining sludge is dewatered and compacted to a solid condition for disposal in a public waste facility. The clarified water is transferred to a steam generator or pressurized water delivery system for reuse. The invention is particularly useful for equipment cleaning operations such as in truckyards or airports.

16 Claims, 6 Drawing Sheets

FIG. I

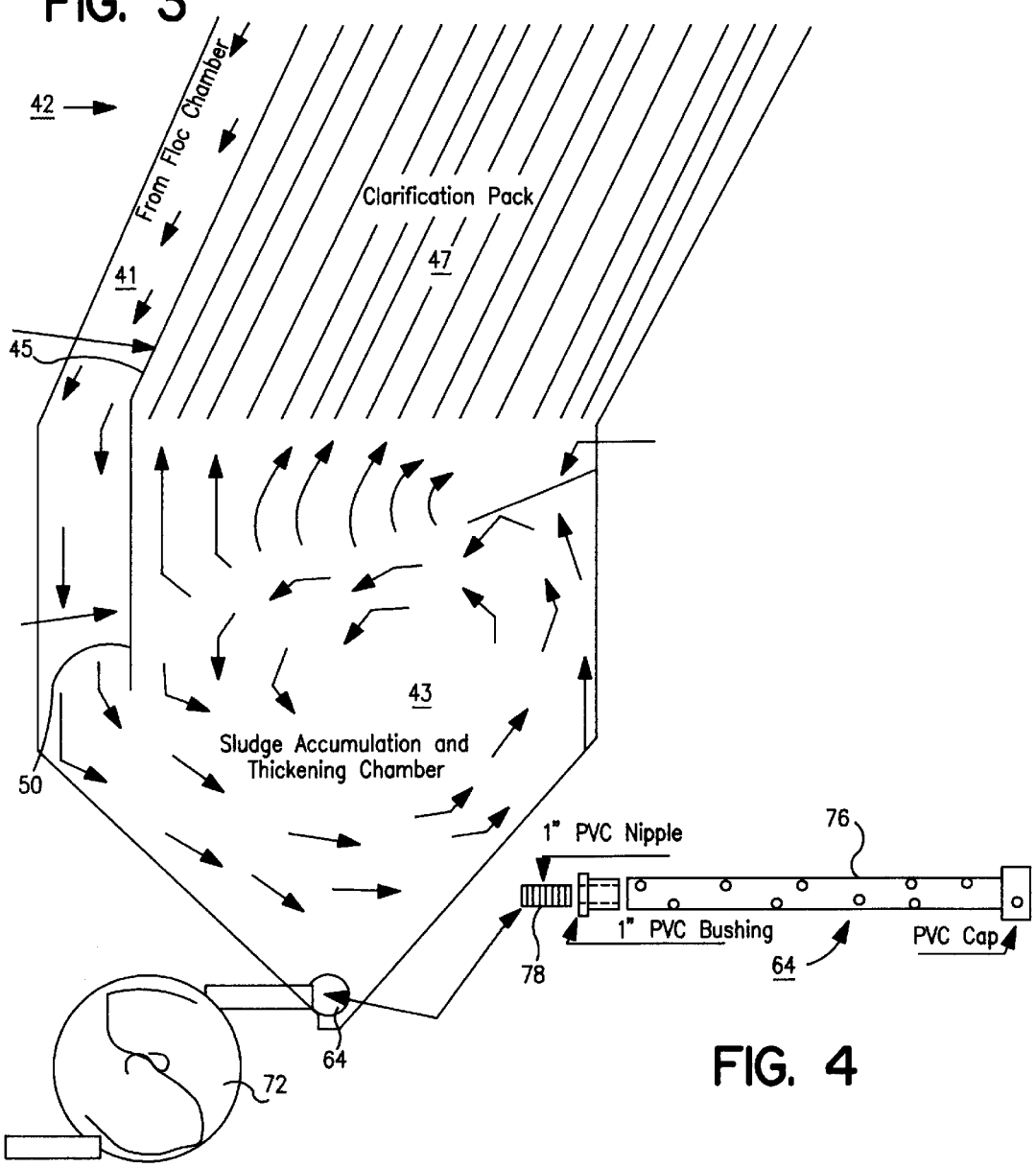

SYSTEM FOR RECYCLING WASTE WATER

FIELD OF THE INVENTION

This invention relates to methods and apparatus for recycling wastewater and particularly to a system for extracting sludge.

BACKGROUND OF THE INVENTION

There are presently on the market a number of systems for treating and recycling waste water. Present state of the art systems that are available to the small industrial waste stream generator is deficient in its ability to consistently produce clean water of sufficient quality that it can be recycled for additional industrial applications. The initial high cost of purchasing many of these systems is beyond the economic limits of many small businesses making cost effective compliance to environmental regulations an impossibility. Most of the water treatment and recycling systems presently available do not address all of the problems associated with industrial waste management wherein the waste water is generally contaminated by a combination of sources.

These remarks are particularly applicable to systems for cleaning equipment such as vehicle fleets of buses, truck tractors and trailers, vehicles for the construction industry and installations for washing airplanes it airports.

Presently, there are two primary methods or technologies available and employed by small commercial/industrial waste stream generators in removing solids and contaminants from waste effluents. Mechanical separation systems account for the majority of equipment used in small waste water treatment applications. These systems can be as simple as small in-line oil/water separators to highly complex filtration units utilizing membrane and multimedia filters. These systems rely upon a mechanical process to separate or screen solids or oil based contaminants from aqueous solutions.

The second technology involves the use of chemical precipitation and is generally reserved for applications involving the removal of heavy metals from plating and other metal working applications. In this process, positive and negative charged polymers are injected into a waste stream. Polymers attract soluble metals and other soil particles forming larger particles called "floc" which, because of their increased mass and weight, precipitate or settle to the bottom allowing the clarified water to remain at the top.

For the small waste stream generator, chemical precipitation is often performed in a batch treatment tank. The waste water is pumped into the tank and polymers are added and thoroughly mixed. The solids created by the flocculation process are pumped from the bottom of the tank and the clear or clarified water is decanted from the upper portion of the tank. The accumulated solids are usually processed through a filter press which removes excess water and reduces volume prior to off-site disposal.

For larger waste stream generators, inclined-plate clarifiers are often utilized which allows for a continuous flow precipitation process. These systems are generally quite large, expensive and require a trained technical staff to ensure proper operation. The solids produced by this process are normally reduced using a filter press.

Chemical precipitation systems have the ability to remove a wide range of solids and contaminants from waste streams. In the plating industry, it is not uncommon to treat waste influents with metal content exceeding 2000 ppm and produce clarified effluent with residual metals of less than 1 ppm. The primary drawback to this form of waste water treatment is that the process is highly susceptible to changes in the chemical makeup of the stream. Slight changes cause imbalances in the chemistry that will disrupt the precipitation and clarification process and normally requires constant monitoring by a technical staff. For these reasons, precipitation systems are utilized primarily by large waste water stream generators, high tech industries and firms generating contaminated waste effluent that can only be treated using this technology.

Filtration systems account for the largest percentage of all types of water treatment units employed by small industrial waste stream generators. Coupled with oil/water separators and mechanical oil skimming devices, filtration systems are used in all types of industrial cleaning effluents. Unfortunately, with the enforcement of the new clean water discharge regulations, the majority of these filtration systems do not adequately reduce contamination levels to acceptable discharge limits or produce water of high enough quality that it can be economically recycled.

U. S. Pat. No. 5,013,435 to Rider et al discloses a combination settling and chemical treatment system in which the water is passed upward through several zones. Tile first zone is an array of inclined tubes. The upper zones of are trays of various agents selected to precipitate ionic pollutants that are then removed by filtration.

U.S. Pat. No. 5,571,336 to Wurzburger et al discloses a base solution for cleaning aluminum made from a solution of CaO added to sulfuric acid.

Various disclosures teach methods for aiding in the precipitation of pollutants from liquids. For example, U.S. Pat. No. 5,380,430 to Overton et al discloses a magnetizing apparatus for treatment of fluids.

Common problems that are often experienced by companies using commercial filtration equipment for the treatment of industrial effluents include the following:

1. Recycled water is not clean, looks like "gray" water, will not consistently produce clean recyclable water.
2. Recycled water can have a strong "rotten egg" odor ($H_2S$).
3. Systems have a high purchase price.
4. System require too much maintenance and management of the system is labor intensive.
5. Systems do not provide for convenient disposal of sludge.
6. Spent filter cartridges become hazardous materials requiring costly disposal.
7. Expensive to operate.

OBJECTS OF THE INVENTION

Accordingly, it is an object of this invention to provide a system for treating wastewater that is directed toward:

a closed loop with zero discharge and producing water of sufficient quality that it can be recycle for a variety of industrial applications.

removing the majority of solids;

removing both free floating and emulsified oils;

eliminating the cause of odor by killing the odor producing bacteria by removing a majority organic particulate and dissolved matter thereby reducing the bacteria's food source;

reducing sludge volume and destroying hydrocarbons by bacterial digestion process;

most importantly, providing an economic method of reducing sludge and rendering hydrocarbons non-hazardous.

Use of the system is particularly directed toward treatment of industrial waste effluent typically generated in the maintenance of trucks, buses, heavy road maintenance equipment, fleet vehicles and similar types of equipment frequently maintained utilizing steam or hot/water pressure washers. The recycled water produced by the system shall be of sufficient quality that it can be recycled for additional use in fleet vehicle washing applications.

SUMMARY OF THE INVENTION

This invention is directed toward a system of wastewater management in which drainage from an operation such as used for equipment cleaning is pumped into a mixer and mixed with chemical flocculating agents to flocculate (or precipitate) pollutants, decanted to remove floatable pollutants, then passed through an incline settling chamber to settle out sludge in a bottom region of the chamber and permit clarified water to pass out of the top of the chamber ready for reuse. All of the pollutants separated from the clarified water are conducted to a bioremediation chamber where hydrocarbons are digested by the bacteria and the remaining pollutants (mostly dirt) are compacted and dried for convenient disposal or reclaim.

BRIEF DESCRIPTION OF THE FIGURES

FIG. 3 shows a section of the clarifier in greater detail.

FIG. 4 shows details of the sludge exit means.

DESCRIPTION OF THE BEST MODE

Figure 1:
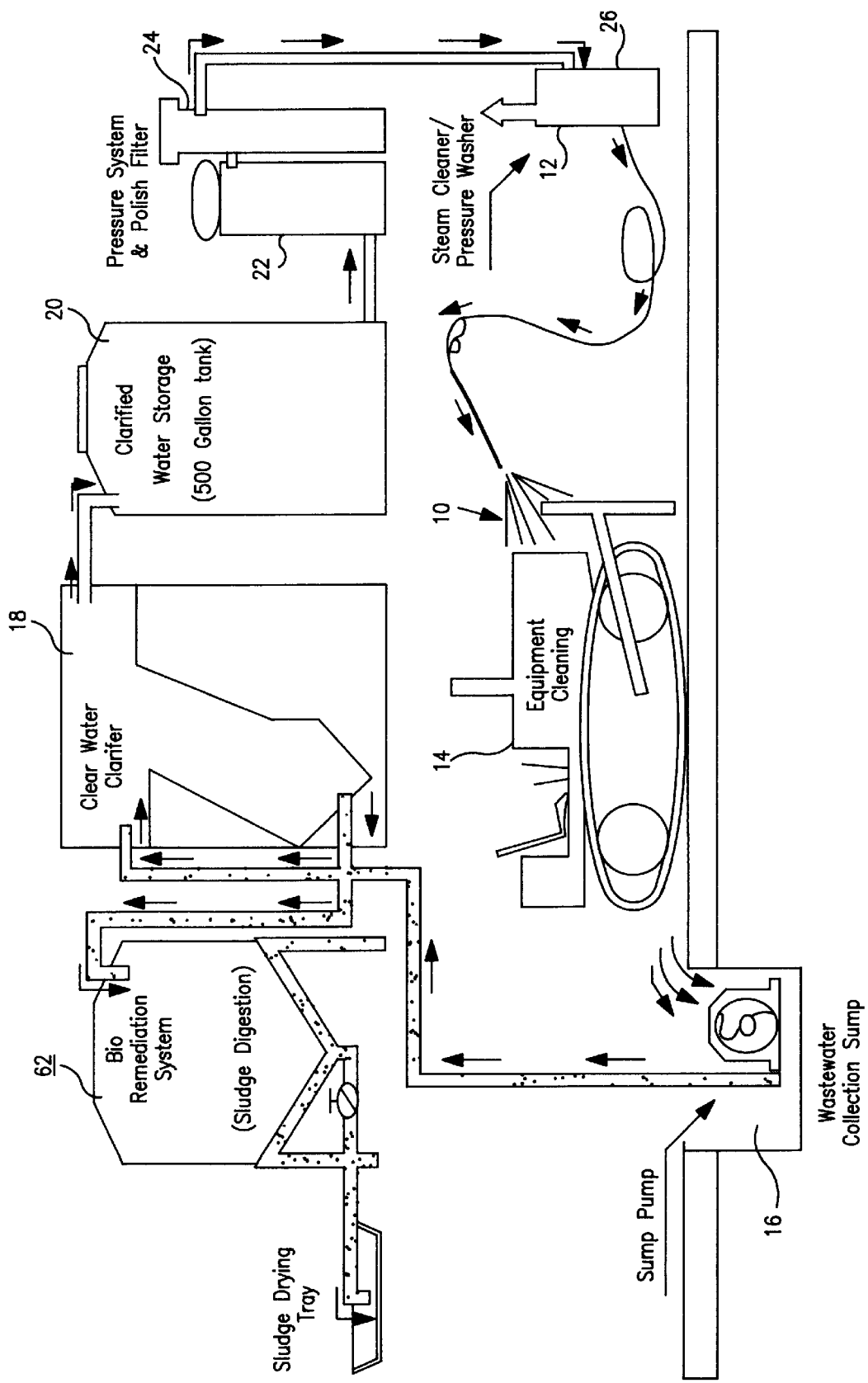
FIG. 1 shows the apparatus of this invention illustrating the steps in the method for recycling wastewater for use in an industrial process.

Turning now to a description of the drawings, FIG. 1 shows the general arrangement illustrating the flow diagram of a system for treating and recycling water used in an equipment cleaning operation in accordance with the invention. There is shown a heavy stream of water 10 from a steam cleaner or washer 12, being directed against a piece of equipment 14 (a bull dozer, for example). The water is collected in a collection sump 16 and pumped to the top side of a water clarifier 18 where it is treated by flocculating and settling processes causing flocculated contaminants to settle to the bottom of the clarifier 18. Clear water rising to the top of the clarifier 18 is decanted into a storage tank 20 then pumped by pump 22 through filter 24 to steam cleaner generator or pressure washer 26.

Figure 2:
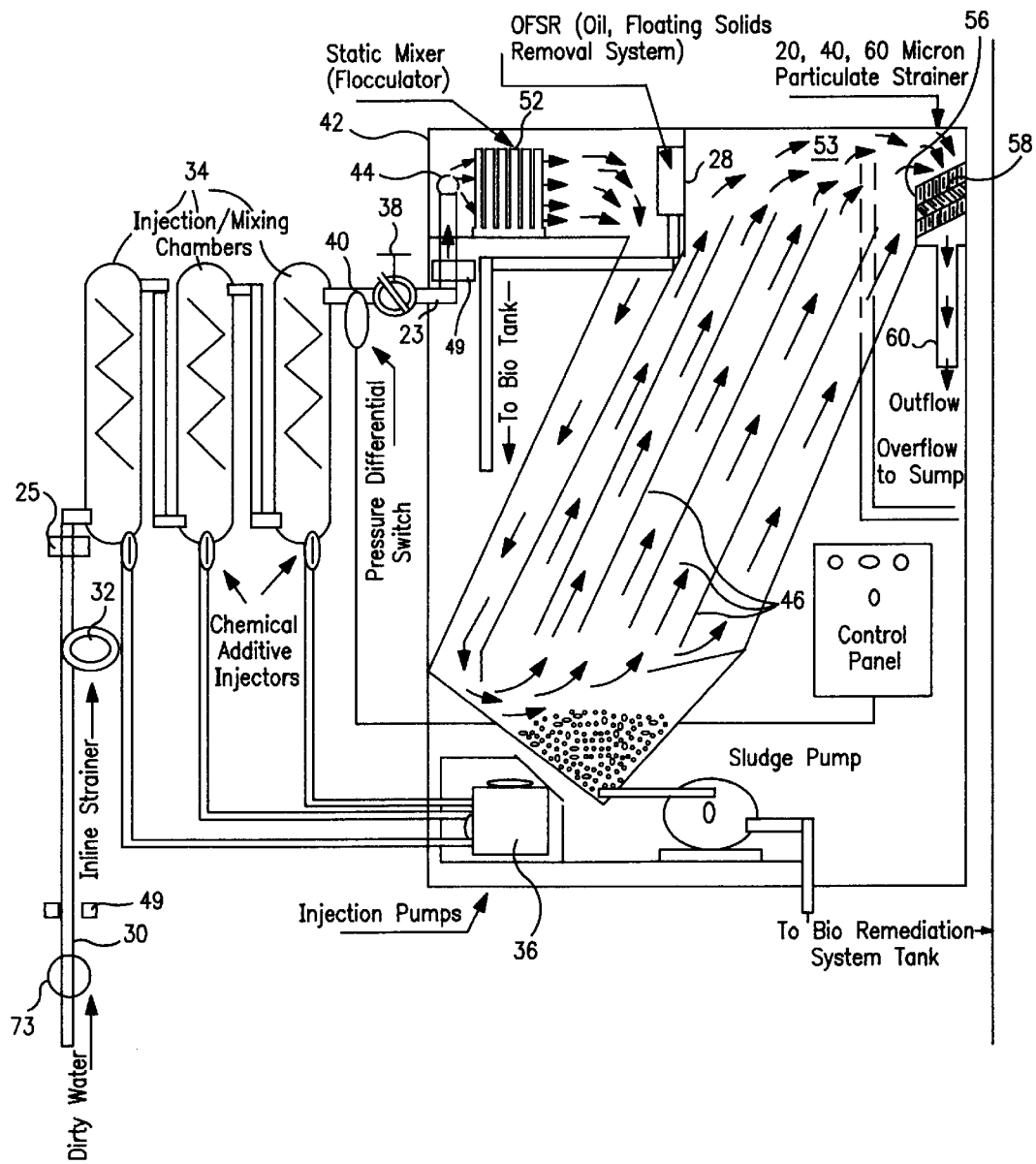
FIG. 2 shows the water clarifier of this invention.

Construction of the clarification unit 18 is shown in FIG. 2. Dirty water entering through conduit 30 from the sump passes through an array of magnets 49 which impose a "north homopolar" magnetic field on the water then through flowmeter 73.

In the context of this specification, the term "north homopolar" magnetic field is understood to mean the field generated by an array of bar magnets oriented radially with respect to conduit 30 with the north pole of each magnet proximal to the conduit.

The water stream then passes through a flow meter 73, an in-line strainer 32 and check valve 25 The water then passes through a series of injection/mixing chambers 34 (three are shown in FIG. 2). Each chamber 34 receives a chemical agent from a corresponding injection pump 36.

The injection pumps 36 are variable output and are matched to the waste stream.

Each one of chambers 34 is injected with an agent to flocculate (precipitate) anionic pollutants and another one of the chambers is injected with with an agent to flocculate (precipitate) cationic pollutants. The third mixing chamber is used for injecting pH adjusting chemicals.

A preferred agent for precipitating heavy cationic contaminants is prepared by adding CaO or $Ca(OH)_2$ to about 15% sulfuric acid to raise the pH to a range of 12.1 to 13.1 then filtering to remove precipitated Ca sulfate particles.

Figure 7A:
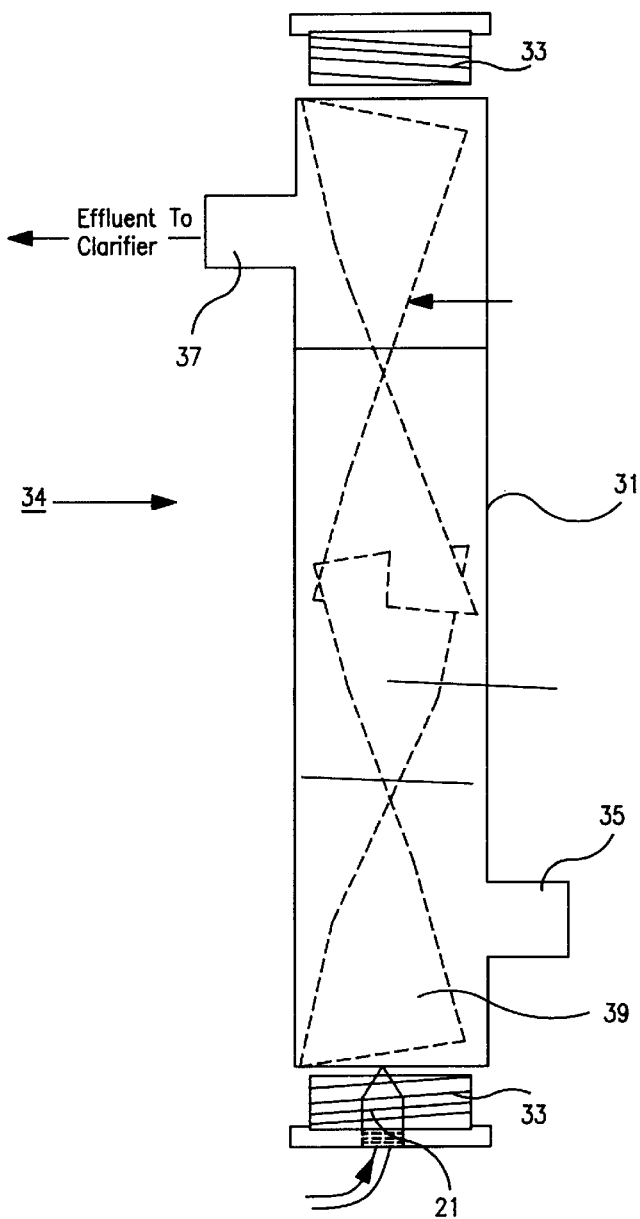
FIGS. 7A and 7B show details of the mixing chamber.
Figure 7B:
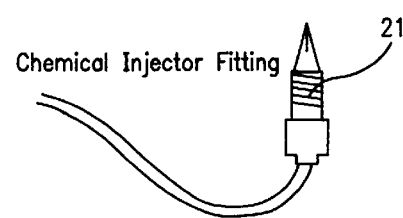
Figure 8:
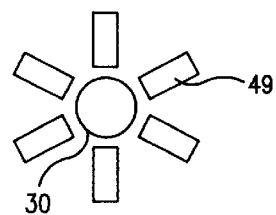
FIG. 8 shows an array of magnets arranged to generate a "homopolar" field.

FIG. 7A is a sectional view showing details of one of the chemical mixing chambers 34. There is shown a PVC pipe 31 with a cap 33 screwed into each open end. One nipple 35 is joined to the bottom end of the pipe 33 for admitting influent from the sump or adjacent mixing chamber and another nipple 37 is joined to the top end of pipe for exiting effluent to the clarifier section 18. A plastic sheet 39 is twisted to form a mixing spiral 39. A chemical injection nozzle 21 is screwed into the lower cap 33. The injector nozzle 21 is shown to best advantage in FIG. 7B.

The current of water passing out of the series of mixing chambers 34 is controlled by switch 38 responsive to a pressure differential sensor 40. The conduit 23 carrying the water from the mixing chambers 34 is positioned in a "monopolar" magnetic field. generated by an array of magnets 49 which is treating the water passing through flow meter 73. The magnetic units 49 convert $CaCO_3$ (calcium carbonate) to Araganite which has passed through the system without precipitation.

The water then enters the clarifying tank 42 through an aerator 44 where the water first passes through a flocculator 52. The flocculator 52 is an array of panels which introduces turbulence in the stream to promote reaction of the chemical agents with the pollutants to enhance the agglomeration of pollutants to floccules. A portion of the floccules are floatable by virtue of the air that has been absorbed into the waste stream by the aerator.

Thereafter, the top layer of the stream which may contain oil and/or floating floccules, is decanted through an OFSR system 28 (oil and floating solids removal) and passed to bioremediation tank 62.

Figure 6A:
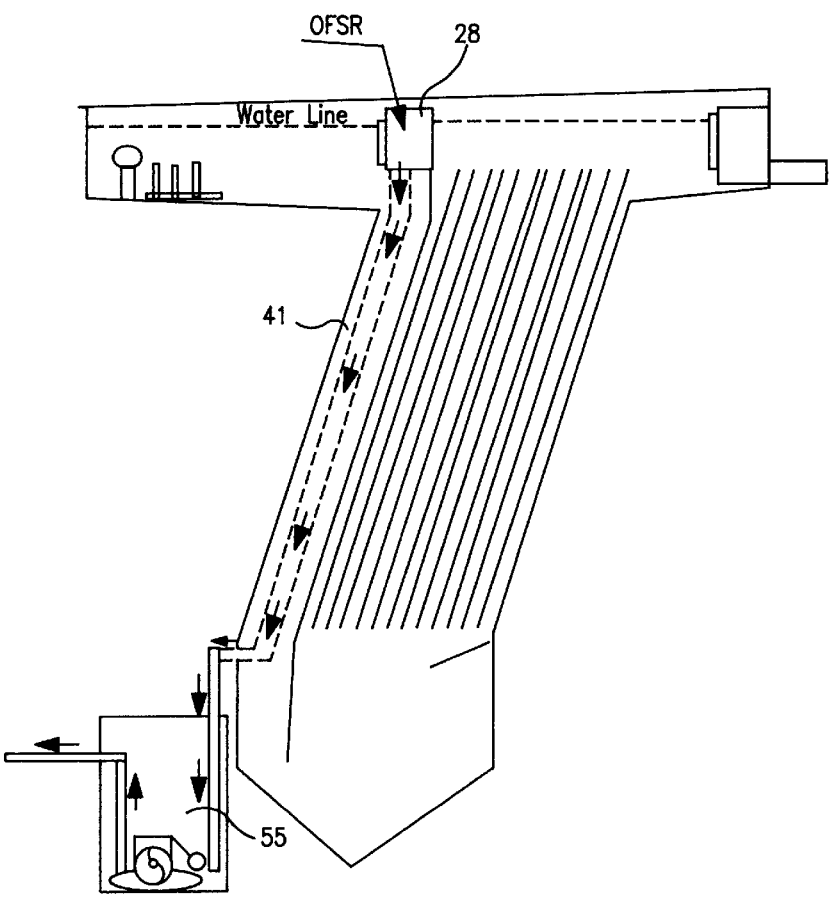
FIGS. 6A and 6B show the decanting section.
Figure 6B:
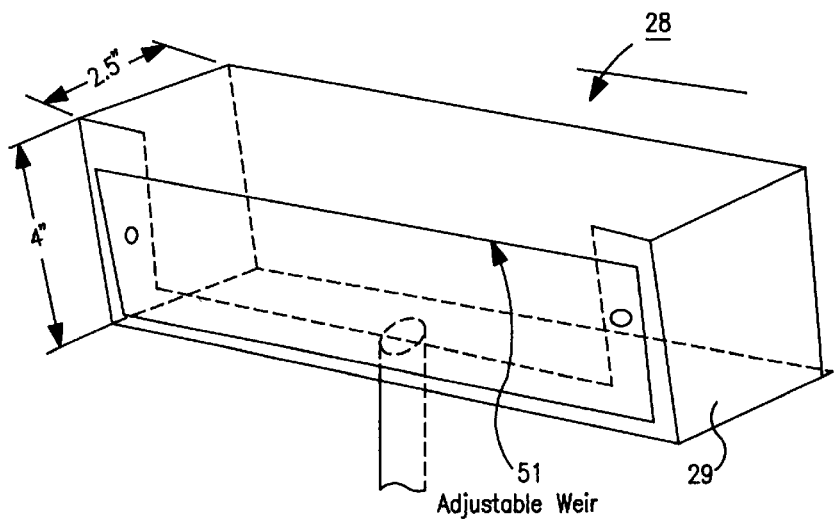

The OFSR system 28 is shown to better advantage in FIGS. 6A and 6B. FIG. 6A shows the OFSR system at the top entry end of the flocculation chamber 41 and is shown in clearer detail in FIG. 6B. The OFSR system 28 includes a housing 29 with an adjustable weir 51 forming the entry face of the housing 29. The adjustable weir 51 is set to the exact level of the water. Floating oil and solids (floating flocculles) continue to accumulate and float over the adjustable weir 51 into the compartment inside housing 29 and gravity flow to the lift station 55 for disposal into bioremediation tank 62. In addition to oil, the OSFR unit can be adjusted to accept floating solids caused by gasification of the floc materials which commonly occurs in the treatment of organic effluents. With the addition of air (sparging at the injector/mixers) 44, the unit will perform as a "dissolved air flotation system" (DAF). so that the construction of the OFSR system will operate as a Dissolved air flotation system and still allows the precipitation system to work simultaneously.

The water then passes through incline channels shown by arrows between incline surfaces 46 such that sludge 54 settles toward the bottom of the tank 42. The panels 46 are preferably corrugated PVC panels or tube nests inclined at an angle of 51°. The angle of inclination is very critical for efficient settling. The clarified water passes over weir 56 and through a bank of 20, 40, 60 micron filters 58, and out through outflow conduit 60.

FIG. 3 is a side sectional view of the clarifying tank showing the unique design of this invention in establishing a flocculating chamber 41, a thickening zone 43 within the sludge chamber section of the clarifier tank 42 and a clarifying section 47. Effluent descends through flocculation chamber 41 separated from the clarification section 47 by panel 45. The flow is directed to the bottom of the chamber by the angle and length of the tailend section 50 of the panel 45 separating the flocculating zone 41 from the clarifying zone 47.

In the thickening zone 43, liquid sludge with high ionic charges continue to agglomerate (thicken) in the presence of additional volumes of similar sludge. State of the art clarifiers generally utilize slow-speed electric mixers and augers to accomplish additional thickening. The unique design of the present invention utilizes the directional flow and energy of the waste steam thereby reducing the requirement for additional energy.

The waste stream then flows up the incline planes 47 in which area, the sludge tends to slide back to the bottom of sludge forming region 43 while clarified water flows upward, guided by the incline planes and emerge into the "clarified" region 53 (FIG. 2). The clarified water is then "polished by flow through filters which are preferably 20, 40, 60 micron filters.

The clarified water is now in condition for reuse and flows back to a steam generator or water pressure system.

A sludge evacuation manifold 64 in the bottom of clarifying tank 42 is shown to better advantage in FIG. 4 and is seen to comprise a PVC pipe 76 with an array of holes. This preferred construction, located on the bottom of the clarifying tank 42, eliminates bridging by removing equal amounts of liquid sludge from the entire bottom width of the bottom of the clarifying tank 42. Nipple 78 in one end of the sludge manifold 74 connects to the vacuum side of the sludge pump 72. The sludge pump 72 is timer controlled to turn on periodically to clear the region including the sludge manifold 64. The sludge is pumped from the sludge evacuation manifold into the bioremediation tank 62.

Figure 5:
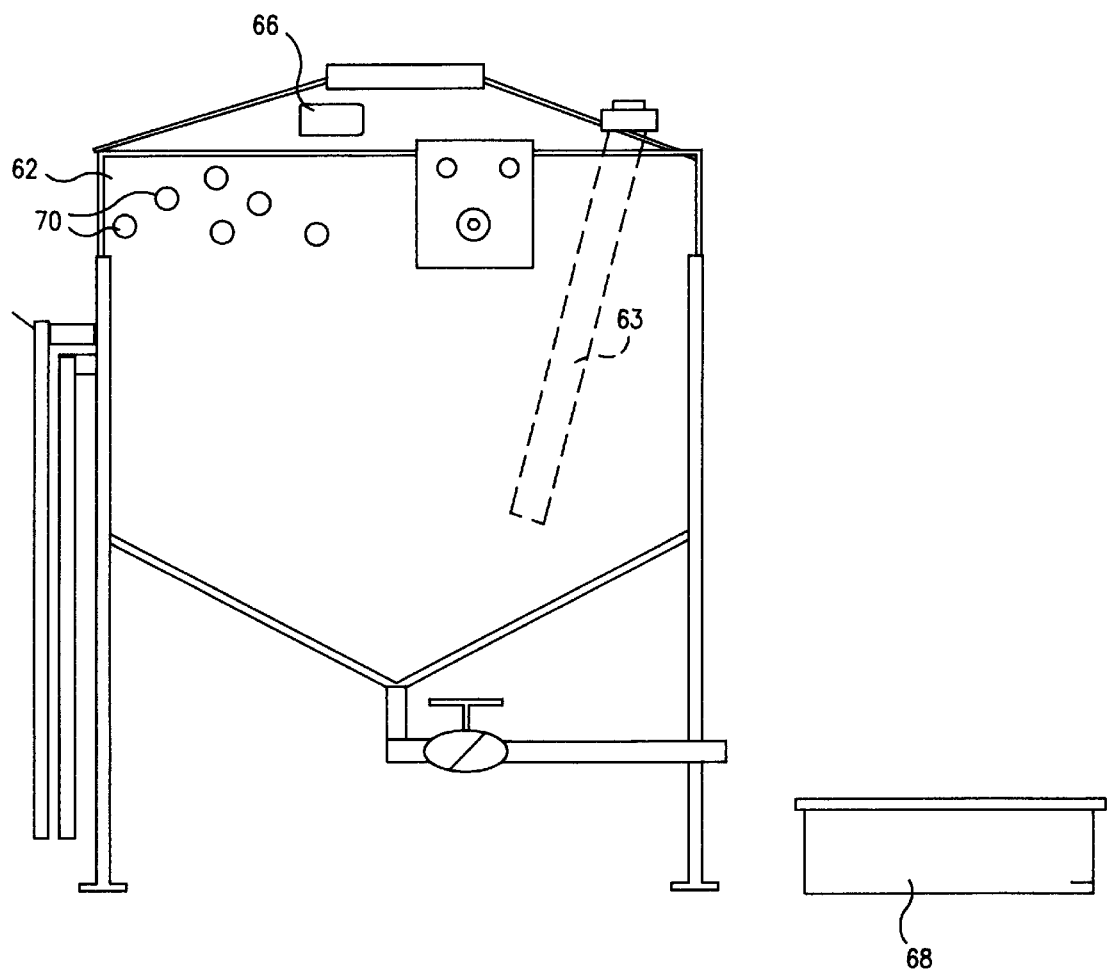
FIG. 5 shows details of the bioremediation tank.

FIG. 5 is a mechanical schematic view of the bioremediation system showing a tank 62 with an immersion heater 63 and air pump 66. Residue from the bioremedial digestion process drains from the bottom of the tank 62 to a drying tray 68. Plastic bio-balls 70 create an environment with a large surface area to enhance bacterial growth.

The foregoing description defines a system and method that meets the objects of the invention. The system is especially adaptable to conditions where a variety of pollutants is present which require a combination of treatments that are compatible with one another.

The waste water system may contain many natural contaminants such as calcium, magnesium and other alkali salts. These impurities severely inhibit standard water treatment systems.

According to the practices of the invention, the system incorporates strong monopolar magnetic fields which alter otherwise soluble calcium and magnesium salts so that they can be precipitated and filtered out in the treatment system rather than remain to disable flowmeters and float switches.

Waste streams can be treated with a de-chelation chamber that effectively removes high levels of organics and bacterial contamination. For example, a multiple de-chelation chamber pre-treatment unit positioned ahead of a multiple flocculation system was used to treat olive processing waste water. This waste stream had an organic level of 11,000 ppm Biological Oxygen Demand (BOD) level and 28,000 ppm Chemical Oxygen Demand (COD) level and a salt level of 60,000 ppm. After a double sequential treatment, the BOD's were reduced to 1700 ppm (99% reduction), the COD's were reduced to 3400 ppm (88%) reduction) and the salt level reduced to 8200 ppm (87% reduction). When the sequence was extended to 5 units in series, the BOD's were reduced to 620 ppm (98% total removal), the COD's wew reduced to 1200 ppm, a 96% removal, and the salt level (chlorides) were reduced to 2900 ppm (95% reduction Bacterial levels have been reduced from 103,000 per ml to less than one per ml, a 99.995% reduction (greater than 4.7 log kill). This stops any residual biological action in the treated water. This eliminates the smell associated with most standard waste treatment systems during hoe weathers.

A novel clarifying unit including an OFSR feature has been disclosed which removes both floccules that are heavier and those that are lighter than water. Construction of the sludge exit port prevents bridging. The chemical mixing units are adapted to mixing in a variety of precipitating agents and pH modifiers which, with the use of the magnetic pretreatment device, enables Calcium to be removed. With use of an electrical pretreatment device (dechelation unit) soluble organics can be precipitated and all bacterial contaminants are virtually destroyed. Variations and modifications of the invention may be suggested by reading the specification and studying the drawings which are within the scope of the invention. We therefore wish to define the scope of the invention by the appended claims.

What is claimed is:

1. A method for removing pollutants from water used in an industrial process wherein the process discharges said pollutants into water whereby a waste water stream is generated, said pollutants including at least one of immiscible floatable liquid and a polluting constituent that can be converted to floccules, said method including the steps;

mixing in a chemical agent prepared by the steps;
adding CaO or $Ca(OH)_2$ to about 15% sulfuric acid to raise the pH to a range of 12.1 to 13.1 thereby preparing an additive solution;
filtering said additive solution to remove precipitated Ca sulfate particles whereby said polluting constituent are converted to floccules;
injecting air into said waste water stream whereby a portion of aid floccules becomes associated with said air and becomes a floatable portion of floccules in said water;
decanting said floatable portion of floccules and said floatable liquid from said waste stream in said separation region;
passing said waste stream into a sludge forming region below an array of incline panels and up through spaces formed between the panels to a clarified region at the upper end of said inclined panels thereby permitting non-floatable floccules to settle in said sludge forming region;
removing said sludge from a bottom section of said sludge forming region;
discharging said clarified water from said clarified region for reuse in said industrial process.

2. A system communicating with a source of water containing contaminants used to clean equipment, said system for use in removing said contaminants from said water wherein said contaminant consists of immiscible floatable liquid and a polluting constituent convertible to a precipitate by a precipitating agent after being subject to a magnetic field wherein said system comprises:

a conduit communicating with the source and arranged for conducting said water from said source;

an array of magnets arranged to generate a north homopolar magnetic field around said conduit;

means communicating with said conduit for injecting said precipitating agent into said water and for adjusting a pH of said water to a required value selected to generate said precipitate;

means communicating with said injecting means for aerating said water containing said precipitate whereby one portion of said precipitate are rendered floatable in said water leaving a remainder of said precipitate being non floatable;

means communicating with said aerating means for separating said floatable one portion of said precipitate from said water;

means for separating said nonfloatable remainder of said precipitate from said water and drawing off said water from said system;

said means for separating said nonfloatable remainder of said precipitates from said water communicating with said means for separating said floatable portion of precipitates from said water.

3. The system of claim 2 wherein said means for injecting said precipitating agent into said water and for adjusting a pH of said water containing said contaminants to a required value selected to generate precipitates from said polluting constituent in said water comprises:

an array of mixing tubes, each mixing tube having an entry end opening opposite an exit end opening;

each mixing tube of said array of mixing tubes connected in series permitting said water to flow through said array of mixing tubes, one after the other;

each said tube having an injector nozzle means proximal to said entry end opening of said respective mixing tube for injecting one of at least one chemical agent into said water;

said at least one of said chemical agent selected to cause said polluting constituent to form said precipitates.

4. The system of claim 3 wherein each one of said at least one mixing tube contains a spiralled mixing panel whereby mixing of said chemical agent with said stream is abetted by passing through said respective tube.

5. The system of claim 3 which comprises at least one pump for pumping chemicals, one said pump for each one of said at least one mixing tubes.

6. The system of claim 3 wherein said array of magnets comprises an array of bar magnets, each said bar magnet oriented perpendicularly toward a conduit carrying said stream and having a north pole end against said conduit.

7. The system of claim 2 wherein said means for separating said floatable portion from said water comprises:

a housing having a housing entrance communicating with said aerating means;

a weir operably arranged inside said housing to permit that when said water containing precipitates enters a first region of said housing, a portion of said water carrying said floatable portion of precipitates flows over an edge of said weir into a second region of said housing and said nonfloatable remainder of said precipitates are retained in said first region of said housing;

said housing having a first exit for conducting said nonfloatable remainder of said precipitates out of said first region of said housing;

said housing having a second exit for conducting said floatable portion of said precipitates out of said second region of said housing.

8. The system of claim 7 further comprising means for forming a sludge of said nonfloatable remainder of precipitates exiting through said first exit.

9. The system of claim 8 wherein said means for forming sludge comprises:

said first exit from said first region of said housing communicating with a lower end of an array selected from a group of arrays consisting of:
(i) parallel incline panels; and
(ii) parallel incline tubes;

said array having a sludge forming region at a lower end of said array and a separation region at an upper end of said array providing that said stream flows into said sludge forming region at said lower end of said allay of panels and rises up through spaces between panel members of said array of panels during which said non-floatable remainder of precipitates settles into said sludge forming region and form sludge and whereby said stream is converted to clarified water collecting in said separation region, a sludge exit for removing said sludge from said sludge forming region;

a clarified water exit for discharging said water from said separation region.

10. The system of claim 9 which comprises a means communicating with said sludge forming region of said housing for collecting said sludge.

11. The system of claim 10 wherein said sludge collecting region is defined by a cross section that tapers downwardly to an elongated linear exit and said system further comprises a sludge compacting means which comprises;

a sludge evacuation manifold being a pipe with an array of holes in said pipe;

said pipe arranged along said elongated linear exit;

a sludge pump communicating with one end of said pipe operably arranged in combination with said pipe and said sludge forming region with cross section tapering downwardly to provide that said sludge is pumped through said array of holes into said pipe and pumped out of an end of said pipe.

12. The system of claim 11 which comprises a bioremedial means communicating with said second region of said means for separating floatable precipitates from said stream and is arranged to receive said sludge pumped by said sludge pump.

13. The system of claim 12 wherein said bioremedial means comprises a tank means for culturing bacteria which consume hydrocarbons and leave only a reduced amount of residue.

14. The system of claim 9 wherein said system is applied to directing said stream with pollutants removed onto equipment whereby said equipment is cleaned and said system further comprises:

a storage tank means connected to said separation region at said upper end of said array for storing said water that has been clarified emitted by said means for separating said nonfloatable remainder of said precipitate from said water said system further comprises one selected from the group consisting of (i) a steam generator connected to said storage tank and adapted for directing a pressurized steam spray at said equipment; and (ii) means connected to said storage tank for spraying pressurized water at said equipment;

said system further comprises sump means for collecting water draining from said equipment as a waste stream and returning said water to said communicating conduit.

15. The system of claim 14 wherein said sump means comprises a container located at a level below said equipment permitting water draining from said equipment to drain into said container and a sump pump connected to pump water from said container to said communicating conduit.

16. The system of claim 2 wherein said precipitating agent comprises:

an aqueous solution of $Ca(OH)_2$ added to 15% sulfuric acid in an amount sufficient to raise pH of the agent to a range from 12.1 to 13.1 and then filtered to remove calcium sulfate precipitate.

* * * * *